United States Patent [19]

Munier

[11] 3,961,567
[45] June 8, 1976

[54] MACHINE FOR AUTOMATICALLY MAKING PANCAKES

[75] Inventor: René Munier, Dourdan, France

[73] Assignee: Societe Industrielle pour la Construction de Materiels Automatiques S.I.C.M.A., Dourdan, France

[22] Filed: June 25, 1974

[21] Appl. No.: 483,002

[52] U.S. Cl. .................................. 99/327; 99/355; 99/357; 99/423; 99/431
[51] Int. Cl.² ...................... A23P 1/00; A47J 37/10
[58] Field of Search ............ 99/326, 327, 334, 335, 99/355, 357, 423, 427, 431, 443 R; 425/272, 274, 223, 273

[56] References Cited
UNITED STATES PATENTS

| | | | |
|---|---|---|---|
| 2,663,249 | 12/1953 | Epstein | 99/423 |
| 3,267,836 | 8/1966 | Yepis | 99/427 X |
| 3,534,676 | 10/1970 | Rubino | 99/327 X |
| 3,829,593 | 8/1974 | In-Wai Hui | 99/339 X |

Primary Examiner—Peter Feldman
Assistant Examiner—Alan Cantor
Attorney, Agent, or Firm—Wenderoth, Lind & Ponack

[57] ABSTRACT

A machine for automatically making pancakes, includes a heated cooking drum which is rotatable about a horizontal shaft by drive means and which has, on its periphery, at least one raised surface area having a contour corresponding to the shape of the pancakes to be made, and which is disposed above a batter pan in such manner that the raised surface area is enabled, during rotation of the drum, to move into contact with batter contained in the pan, means for supplying the batter pan with pancake batter from a supply container, the pan having on at least one side a lateral wall, which is of lesser height than the height of the other walls of the pan and the exterior face of which is disposed vertically above an opening in the batter supply container, and means for detaching and removing the cooked pancakes from the drum and comprising a brush rotatable in the same direction as the drum and at a peripheral speed greater than that of the drum, the brush having flexible radial bristles which are arranged to come into contact with the raised surface area of the drum.

10 Claims, 3 Drawing Figures

MACHINE FOR AUTOMATICALLY MAKING PANCAKES

BACKGROUND OF THE INVENTION

The present invention concerns a machine for automatically making pancakes and of a type comprising a heated cooking drum which is mounted for rotation on a horizontal shaft, is connected to means which impart rotary movement thereto, has on its periphery at least one raised surface area having a contour corresponding to the shape of the pancakes to be made, and is disposed above a batter pan in such manner that the raised area is adapted to be immersed in the batter contained in the pan, the machine also comprising means for detaching and removing the cooked pancakes from the raised surface area of the drum.

A known machine of this kind is described, for example, in United States Patent No. 2,663,249.

In the known machines, the batter contained in the pan becomes stagnant when the machine is stopped, so that, when the machine is stopped for a sufficiently long period, a skin of hardened layer forms on the surface of the batter, due to the heat radiated by the cooking drum. This hardened layer prevents any further making of pancakes, and some adjustment has to be made to enable machines to be started up again. Consequently, the known machines cannot conveniently operate completely automatically, but require the permanent presence of a supervisor.

SUMMARY OF THE INVENTION

The present invention overcomes this disadvantage, and its particular object is to provide a machine adapted to make pancakes completely automatically, without the need for the permanent presence of a supervisor.

According to the invention, there is provided a machine for automatically making pancakes, and including a heated cooking drum which is rotatable about a horizontal shaft by drive means and which has on its periphery at least one raised surface area having a contour corresponding to the shape of the pancakes to be made, and which is disposed above a batter pan in such manner that the raised surface area is enabled, during rotation of the drum, to move into contact with batter contained in the pan, means for supplying the batter pan with pancake batter from a supply container, the pan having on at least one side a lateral wall which is of lesser height than the height of the other walls of the pan, and the exterior face of which is disposed vertically above an opening in the batter supply container, and means fof detaching and removing the cooked pancakes from the drum and comprising a brush rotatable in the same direction as the drum, and at a peripheral speed greater than that of the drum, the brush having flexible radial bristles which are arranged to come into contact with the raised surface area of the drum.

In a new machine according to the invention, the rotating brush enables the raised surface area of the heating drum to be cleaned before a layer of batter is deposited on such raised surface, the raised surface area of the drum to be greased before batter is applied thereto, the pancake to be gently detached, and the raised surface area of the drum to be cleaned after the pancake has been removed, thus keeping the surface clean during the time when the machine is stopped, so that the formation of a film of dried batter on the drum after long periods of stoppage of the machine is prevented, and the sticking of the next pancake on the heating drum is avoided.

Continuous movement of the batter in the pan can be obtained, so as to create an endless film which avoids the formation of a skin and prevents the batter from acquiring a high temperature that would adversely affect the operation of the machine. Furthermore, the pan may be of small capacity, since the batter circulates therein, so that only a small quantity thereof remains unused. The batter supply container may be of large capacity, and thus enables a large number of pancakes to be made. The supply container may be refrigerated so as to keep the batter in good condition.

Advantageously, a pump is provided at the bottom of the batter supply container, the downstream side of which pump is connected to a distributor duct fitted at the bottom of the batter pan, at that side opposite to the lateral wall, and which extends over the entire length of this side, the flow wall being preferably parallel to the shaft of the cooking drum, and constituting the downstream end of the pan as regards the direction of rotation of the drum.

The purpose of the pump is to transfer from the supply container to the pan a quantity of batter greater than is necessary for making one pancake, the surplus being returned to the supply container by overflowing from the pan. The pump permits recycling and stirring of the pancake batter, which has a well-known tendency to form deposits, on the one hand, and to thicken on the other.

In accordance with a further feature of the invention, this machine further comprises coin-operated control means associated with the motor for driving the cooking drum and the rotating brush.

BRIEF DESCRIPTION OF THE DRAWINGS

Other features and advantages of the invention will be seen more clearly from the following description of a preferred embodiment, given with reference to the accompanying drawings, in which.

DETAILED DESCRIPTION OF THE INVENTION

Figure 1:
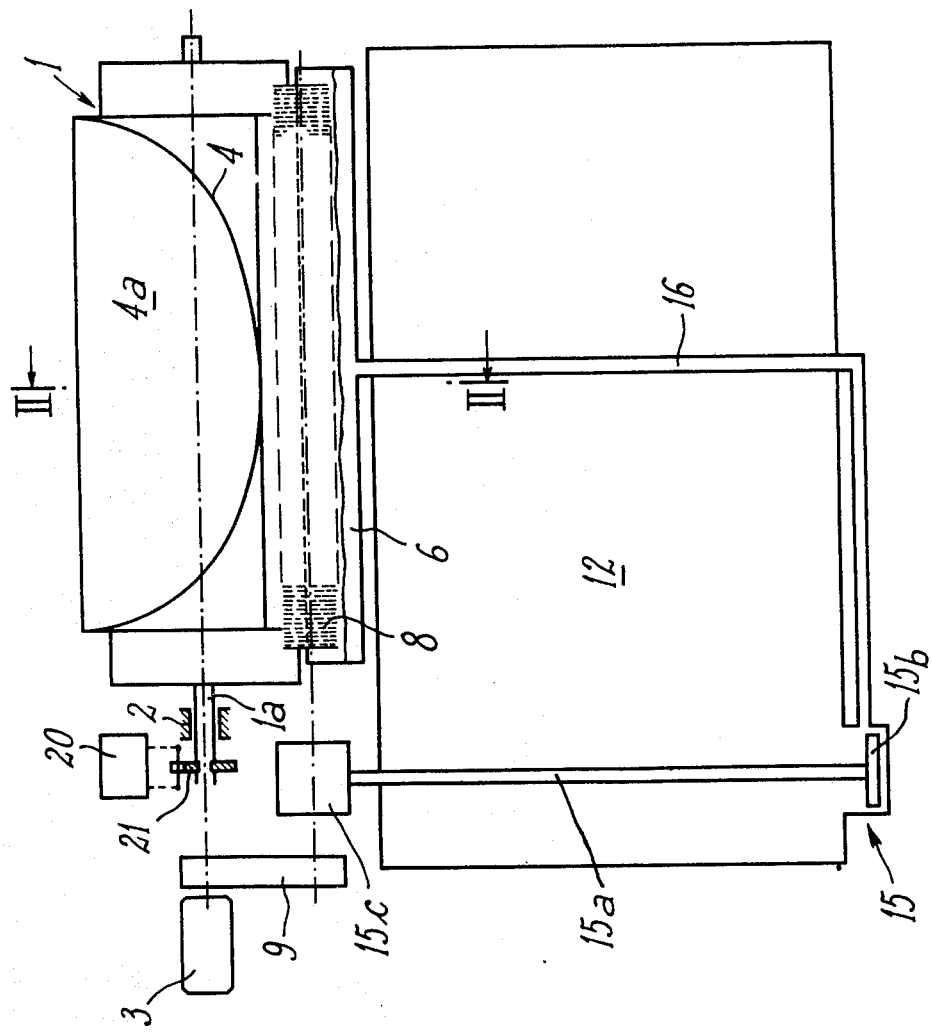
FIG. 1 is a diagrammatic elevational view of one form of a machine according to the invention.
Figure 2:
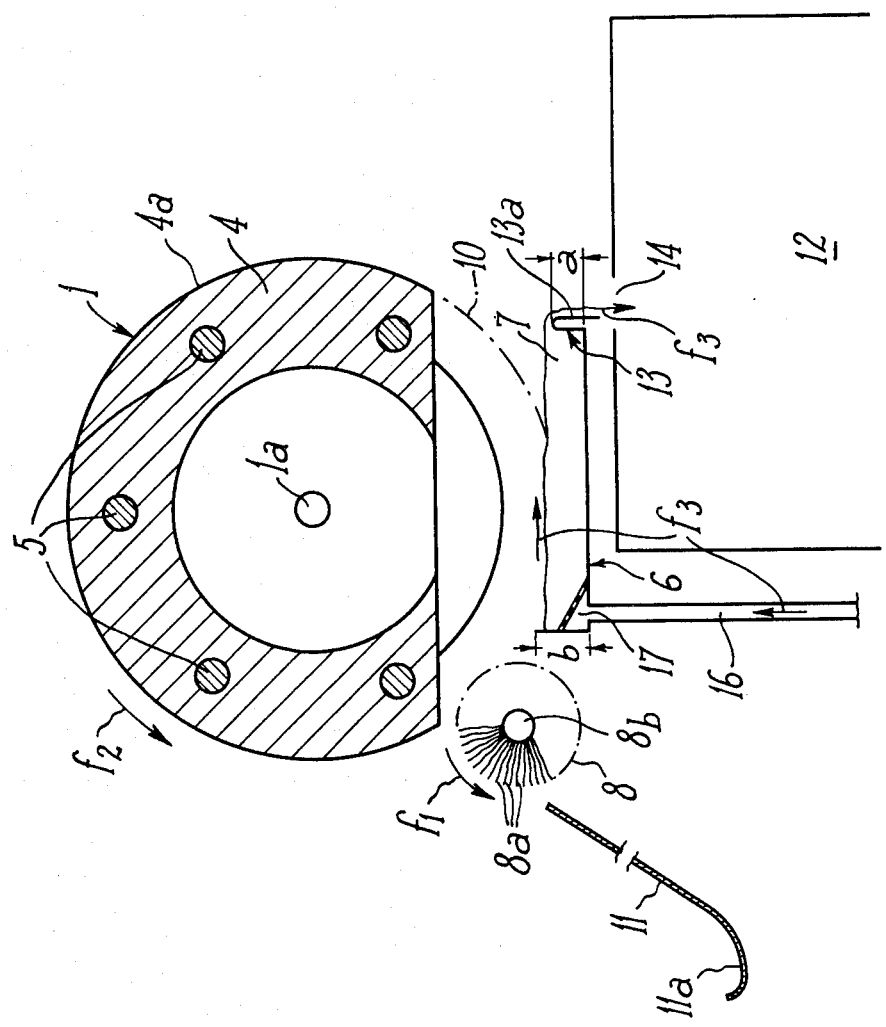
FIG. 2 is a vertical section on the line II—II of FIG. 1.

FIGS. 1 and 2 show a machine for automatically making pancakes. This machine comprises a hollow heated cooking drum 1 which is mounted to rotate on a horizontal shaft 1a supported on a frame 2. Rotary movement is imparted to the drum by drive means comprising an electric motor 3. The periphery of the drum has a projecting portion 4 defining a raised surface area 4a having a contour corresponding to the shape of the pancakes to be made. Electrical resistance heating elements 5 are embedded in the wall of the hollow drum 1, below the raised surface area 4, and each extends parallel to a generatrix of the drum 1 (FIG. 2).

The drum 1 is disposed above a batter pan 6 in such manner that the raised surface area 4 is adapted to be immersed in the batter 7 contained in the pan 6.

The machine illustrated also comprises means for enabling cooked pancakes to be detached and removed from the raised surface area 4a of the drum 1. These means comprise a rotating brush 8, which is driven by the motor 3 through a transmission unit 9, so that the brush 8 turns in the same direction (arrow $f_1$) as that of the drum 1 (arrow $f_2$), and at a greater peripheral speed than the drum. The brush 8 has radial flexible bristles 8a adapted to move into contact and co-operate with the raised surface area 4a of the drum 1.

The shaft 8b of the rotating brush 8 is disposed at a lower level than, and parallel to, the shaft 1a of the drum 1. The position of the shaft 8b, in relation to the trajectory 10 of the useful surface area 4a of the drum 1, is such that the brush is able to detach a pancake under the best possible conditions. Beyond the brush 8 is an inclined plate 11 for receiving the pancakes removed by the brush 8. For this purpose, the plate 11 is disposed substantially tangentially to the periphery of the brush 8 and has a lower concave end 11a at that side remote from the brush 8 for the purpose of retaining the pancakes that slide onto the plate 11.

The batter pan 6 is supplied with batter from a supply container 12 and has, at one side, a lateral wall 13, the height a of which is less than the height b of the other walls of the pan 6, and acts as a weir. The exterior face 13a of the wall 13 is disposed vertically above an opening 14 formed in the upper wall of the supply container 12.

At its bottom, the supply container 12 is equipped with a pump 15, of the centrifugal type for example, the downstream (delivery) side of which is connected by a pipe 16 to a perforated distributor duct 17 which is disposed at the bottom of the pan 6 and at the side thereof which is opposite the wall 13, and which extends over the entire length of this side.

The wall 13 is parallel to the axis of the drum 1, extends over the entire length of a generatrix of the drum and, at each side, extends beyond the projection, in a horizontal plane, of the projecting part 4. The wall 13 constitutes the downstream end of the pan 6, as regards the direction of rotation of the drum 1.

Thus, the continuous flow of the batter in the pipe 16, the pan 6 and the supply container 12, in the direction of the arrows $f_3$ seen in FIG. 2, results in a continuous film which prevents formation of a skin on the surface of the batter 7 contained in the pan 6, and which prevents the batter 7 from rising in temperature under the effect of the heat radiated from the heating drum 1. The centrifugal pump 15 enables the pancake batter to be stirred when it begins to flow, in accordance with a predetermined cycle, for example.

The batter pan 6 is mounted on the frame 2, and its level and slope, relative to the shaft of the drum 1, can be adjusted. Thus, by suitably adjusting the position of the pan 6, it is possible to regulate the quantity of batter that is spread over the raised surface area 4a during each revolution of the drum 1.

The bristles 8a of the rotating brush 8 may be covered with oil or butter in any suitable manner, by means, not shown, for example by immersing bristles 8a in an oil pan, not illustrated.

A transmission shaft 15a connecting the working part of the pump 15, i.e. the rotor 15b of the pump, to a driving motor 15c, extends through the batter, in the supply container 12. The shaft 15a may carry stirring elements, not illustrated, for carrying out additional mixing of the batter.

Figure 3:
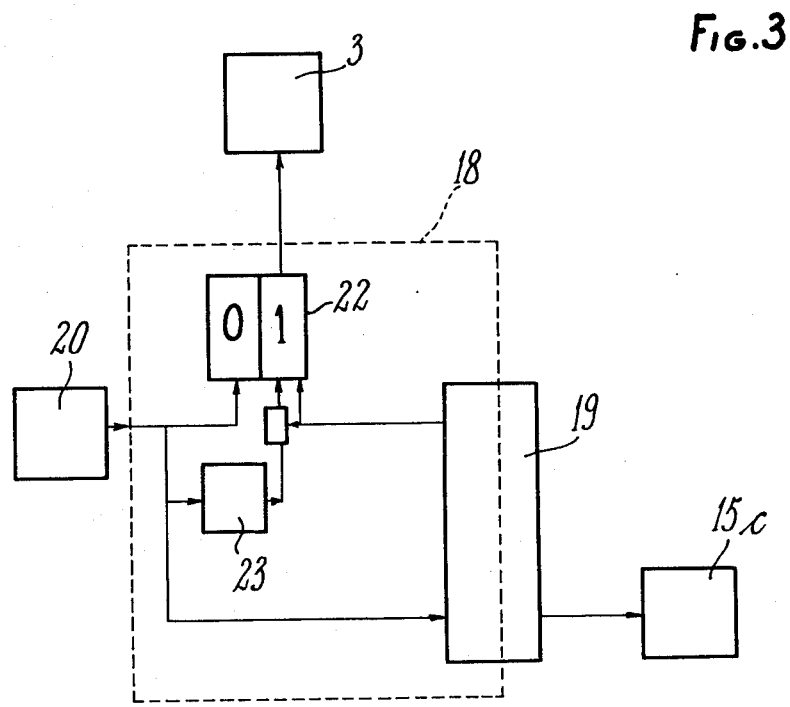
FIG. 3 is a simplified general view of one form of a coin-operated control means for the machine.

FIG. 3 is a simplified general view of coin-operated control means which may be associated with the motor 3 for driving the cooking drum 1 and the rotating brush 8. These control means comprise a programming unit 18 for controlling one or more operating cycles of the machine, depending upon the number of coins or counters inserted in a prepayment apparatus 19, each cycle comprising the following operations: operation of the pump 15 for a predetermined period, until the batter overflows the wall or weir 13; a first rotation of the drum 1, corresponding to the "setting" of the batter to form a pancake; arresting of the drum during a predetermined period required for cooking the pancake, and rotating the drum 1 a second time to enable the cooked pancake to be detached by means of the brush 8. Means are provided for removing the pancake batter 7 contained in the pan 6 from the line of travel 10 of the raised surface area 4a of the drum 1 during the second rotation of the drum. In the present case, the batter 7 is removed from the line of travel 10 by stopping the pump 15 to allow the depth of the batter in the pan 6 to decrease.

As shown diagrammatically in FIG. 3, the programming unit 18 sends a signal to the motor 15c for driving the pump 15, which signal causes the supply of current to the motor 15c to be interrupted when the drum 1 has revolved once, or a pre-set number of times, as will be explained below.

For this purpose, the programming unit 18 receives a signal determining the number of revolutions of the drum 1, this signal being generated by means of a contactor 20 moved by a cam 21 mounted to rotate with the drum 1 (see also FIG. 1).

Thus, when a coin or counter representing the cost of a pancake is inserted in the apparatus 19, a brief signal is sent to an oscillator 22 to bring this into an active condition corresponding to the supply of current to the motor 3. When the drum 1 has made one revolution, the contactor 20 sends a brief signal (i) into the oscillator 22 for returning it to zero, this resulting in stoppage of the motor 3; (ii) to a timing device 23 which, at the end of a predetermined cooking time t, will send a signal to the oscillator 22 to return it to its active condition; and (iii) to a device controlling the motor 15c for the purpose of stopping the latter. When the drum 1 has completed its second revolution, the contactor 20 returns the oscillator 22 to zero. If a further operating cycle is to be carried out, the contactor restarts the motor 15c of the pump 15.

Thus, the use of a brush having flexible bristles in the above described machine enables scoring or other damage to the raised surface area 4a of the drum 1 to be prevented, so that this surface can be formed by a layer of non-stick material such as polytetrafluoroethylene.

What I claim is:

1. A machine for automatically making pancakes, said machine comprising:

a heated cooking drum rotatably mounted about an axis, said drum having on the periphery thereof at least one raised surface area having a contour corresponding to the shape of pancakes to be made;

a batter pan positioned beneath said cooking drum, said batter pan having a plurality of walls, at least one of said walls having a height less than that of the remainder of said walls and an exterior wall face;

a batter supply container positioned beneath said batter pan and having an opening positioned vertically beneath said exterior wall face of said one wall;

means for supplying batter from said container to said batter pan;

drive means for rotating said cooking drum about said axis to bring said raised surface area into contact with batter within said batter pan, whereby a pancake is formed and cooked on said raised surface area;

means for detaching and removing cooked pancakes from said raised surface area, said detaching and removing means comprising a brush rotatable in the same direction as and at a peripheral speed greater than said drum, said brush having flexible radial bristles positioned to contact said raised surface area during rotation of said drum; and coin operated control means, operable in response to the insertion therein of a predetermined quantity of coins, and:

operably connected to said batter supplying means for supplying batter to said batter pan for a predetermined period until said batter overflows said at least one wall of shorter height, operably connected to said drive means for rotating said cooking drum a first complete revolution to cause setting on said raised surface area of a quantity of batter corresponding to one pancake, for thereafter arresting rotating of said cooking drum for a predetermined period corresponding to the time necessary to cook said pancake, and for thereafter rotating said cooking drum a second complete revolution; and operably connected to said brush for rotating said brush to remove the cooked pancake during said second revolution of said drum.

2. A machine as claimed in claim 1, wherein said batter supplying means comprises a pump provided in said container, and a perforated distributor duct connected to the delivery side of said pump and disposed at the bottom of said batter pan at a side thereof opposite to said at least one wall of shorter height, said duct extending over the entire length of said side.

3. A machine as claimed in claim 1, wherein said at least one wall of shorter height extends parallel to said axis of said cooking drum, extends over the entire length of a generatrix of said cooking drum, and is positioned at the downstream end of said batter pan taken in the direction of rotation of said cooking drum.

4. A machine as claimed in claim 1, wherein said batter pan is mounted on a frame which is adjustable to adjust the level and slope of said batter pan in relation to said axis of said cooking drum.

5. A machine as claimed in claim 1, further comprising means for applying oil or butter to said bristles of said rotatable brush.

6. A machine as claimed in claim 2, wherein a drive shaft for said pump passes through said supply container and is provided with stirring elements for continuously mixing the batter in said container.

7. A machine as claimed in claim 1, further comprising means for removing pancake batter contained in said batter pan from the line of travel of said raised surface area of said cooking drum during said second revolution thereof.

8. A machine as claimed in claim 7, wherein said supplying means comprises a pump, and said removing means comprises means for stopping the pump to cause the depth of said batter in said batter pan to decrease.

9. A machine as claimed in claim 1, wherein said control means includes a contactor moved by a cam mounted for rotation with said cooking drum to produce signals representing the revolutions of said cooking drum, and a programming unit arranged to receive said signals and to discontinue operation of a motor which drives said batter supplying means when said cooking drum has executed a preset number of revolutions.

10. A machine as claimed in claim 9, wherein said control means further comprises an oscillator means, connected to a coin receiver and brought to an operating condition to supply current to said drive means by a signal produced by the insertion of a coin into said coin receiver, for rotating said cooking drum, said oscillator means being made inoperative to stop said drive means when said contactor sends a first signal following the completion of said preset number of revolutions of said cooking drum, and timing means receiving said first signal for, at the end of a predetermined cooking time, passing a second signal to said oscillator means to return it to its operating condition and to said motor to stop said motor, said contactor returning said oscillator means to inoperative position.

* * * * *